US009887661B2

(12) United States Patent
Matsumoto et al.

(10) Patent No.: US 9,887,661 B2
(45) Date of Patent: Feb. 6, 2018

(54) MACHINE LEARNING METHOD AND MACHINE LEARNING APPARATUS LEARNING OPERATING COMMAND TO ELECTRIC MOTOR AND CONTROLLER AND ELECTRIC MOTOR APPARATUS INCLUDING MACHINE LEARNING APPARATUS

(71) Applicant: FANUC CORPORATION, Yamanashi (JP)

(72) Inventors: Yasuyuki Matsumoto, Yamanashi (JP); Norihiro Chou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/245,190

(22) Filed: Aug. 24, 2016

(65) Prior Publication Data
US 2017/0063284 A1 Mar. 2, 2017

(30) Foreign Application Priority Data

Aug. 28, 2015 (JP) ................................. 2015-169623

(51) Int. Cl.
*H02P 1/04* (2006.01)
*H02P 29/60* (2016.01)
(Continued)

(52) U.S. Cl.
CPC .......... *H02P 29/60* (2016.02); *G05B 13/0265* (2013.01); *G06N 99/005* (2013.01)

(58) Field of Classification Search
CPC .............. G06N 99/005; G05B 13/0265; G05B 19/4062; G05B 2219/42319; H02P 29/60;
(Continued)

(56) References Cited

U.S. PATENT DOCUMENTS 5,019,760 A * 5/1991 Chu ........................ G01K 1/026
318/490
5,852,351 A * 12/1998 Canada ................ G01R 31/343
318/490
(Continued)

FOREIGN PATENT DOCUMENTS

JP 2003-208205 A 7/2003
JP 2012-509190 A 4/2012
(Continued)

OTHER PUBLICATIONS

Koji Iwamura et al., "Applying Multi-agent Reinforcement Learning to Autonomous Distributed Real-time Scheduling" Journal of the Institute of Systems, Control and Information Engineers, 2013, pp. 129-137, vol. 26 No. 4.

*Primary Examiner* — Bentsu Ro
*Assistant Examiner* — Thai Dinh
(74) *Attorney, Agent, or Firm* — Hauptman Ham, LLP

(57) ABSTRACT

A controller that makes an electric motor efficiently operate in accordance with an ambient temperature. The controller includes a machine learning apparatus learning an operating command to the electric motor. The machine learning apparatus includes a status observing part and learning part. The status observing part observes an ambient temperature of an electric motor apparatus and a cycle time of the electric motor as status variables. The learning part learns an operating command to the electric motor in accordance with a training data set prepared based on a combination of the judgment data acquired by a judgment data acquiring part and the status variables.

8 Claims, 3 Drawing Sheets

(51) Int. Cl.
*G05B 13/02* (2006.01)
*G06N 99/00* (2010.01)

(58) Field of Classification Search
CPC ...... H02P 23/0031; H02P 23/12; H02P 29/68; G01R 31/343
USPC ....... 318/490, 430, 450, 455, 471, 472, 473; 361/25, 27, 63, 91.2, 158, 165
See application file for complete search history.

(56) References Cited

U.S. PATENT DOCUMENTS

| | | | |
|---|---|---|---|
| 8,536,815 B2* | 9/2013 | Vicente | H02P 29/032 318/430 |
| 8,981,697 B2* | 3/2015 | Zeller | H02H 7/0816 318/432 |
| 2008/0048603 A1* | 2/2008 | Discenzo | G05B 19/4063 318/561 |

FOREIGN PATENT DOCUMENTS

| | | |
|---|---|---|
| JP | 2014-239631 A | 12/2014 |
| JP | 2015-103169 A | 6/2015 |

\* cited by examiner

MACHINE LEARNING METHOD AND MACHINE LEARNING APPARATUS LEARNING OPERATING COMMAND TO ELECTRIC MOTOR AND CONTROLLER AND ELECTRIC MOTOR APPARATUS INCLUDING MACHINE LEARNING APPARATUS

RELATED APPLICATIONS

The present application claims priority to Japanese Patent Application Number 2015-169623 filed Aug. 28, 2015, the disclosure of which is hereby incorporated by reference herein in its entirety.

BACKGROUND OF INVENTION

1. Field of the Invention

The present invention relates to a machine learning method and machine learning apparatus learning an operating command to an electric motor and a controller and an electric motor apparatus including that machine learning apparatus.

2. Description of the Related Art

To efficiently perform a desired process utilizing an electric motor, shortening the cycle time is desirable. It is possible to optimize the acceleration or deceleration (below, sometimes referred to as "acceleration/deceleration") of an electric motor so as to shorten the cycle time. In general, the acceleration/deceleration of an electric motor is designated by the operator, so to realize optimization, the knowledge and experience of the operator were relied on to a large extent. Trial and error was also essential.

Another factor making optimization of acceleration/deceleration difficult is the heat generated from a controller controlling the electric motor. An electric motor is controlled so as to operate in a range where no overheating occurs, but whether overheating occurs differs depending on the ambient environment of the electric motor. Therefore, to reliably prevent overheating from occurring, it is necessary to assume the harshest ambient environment when optimizing acceleration/deceleration. As a result, when the ambient temperature is low, the operation of the electric motor is not actually optimized and the cycle time tends to increase.

In is known to adjust the output of an electric motor in accordance with the temperature of the heat generating source. For example, it is known to estimate the temperature of a power semiconductor module for driving an electric motor and limit the output of the electric motor when the estimated temperature exceeds the reference temperature (see Japanese Patent Publication No. 2014-239631A).

SUMMARY OF INVENTION

A controller making an electric motor efficiently operate in accordance with an ambient temperature has been sought.

In a preferred embodiment of the present invention, there is provided a machine learning apparatus learning an operating command for an electric motor, the machine learning apparatus comprising a status observing part observing an ambient temperature of an electric motor apparatus that includes an electric motor and a controller controlling the electric motor, and a cycle time of the electric motor as status variables, a judgment data acquiring part acquiring judgment data judging if overheating has occurred in the electric motor apparatus, and a learning part learning an operating command to the electric motor in accordance with a training data set prepared based on a combination of the status variables and the judgment data.

In a preferred embodiment of the present invention, the learning part comprises a reward calculating part calculating a reward based on the cycle time and the judgment data and a function updating part updating a function for determining the operating command based on the reward.

In a preferred embodiment of the present invention, the reward calculating part is configured to increase the reward when it is judged that overheating is not occurring in the electric motor apparatus and the cycle time is smaller than a predetermined threshold value and to decrease the reward when it is judged that overheating has occurred in the electric motor apparatus or the cycle time is a threshold value or more.

In a preferred embodiment of the present invention, the function updating part is configured to update an action value table in accordance with the reward.

In a preferred embodiment of the present invention, the learning part is configured to learn the operating command in accordance with a training data set prepared for a plurality of electric motor apparatuses.

In a preferred embodiment of the present invention, there is provided the machine learning apparatus, a temperature measuring part measuring an ambient temperature, a time measuring part measuring a cycle time, and a decision-making part determining an operating command corresponding to a current ambient temperature and current cycle time based on the result of learning by the learning part.

In a preferred embodiment of the present invention, there is provided an electric motor apparatus comprising the above controller and an electric motor controlled by the controller.

In a preferred embodiment of the present invention, there is provided a machine learning method learning an operating command for an electric motor, the machine learning method comprising observing an ambient temperature of an electric motor apparatus including an electric motor and a controller controlling the electric motor and a cycle time of the electric motor as status variables, acquiring judgment data judging if overheating has occurred at the electric motor apparatus, and learning an operating command to the electric motor in accordance with a training data set prepared based on a combination of the status variables and the judgment data.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Figure 1:
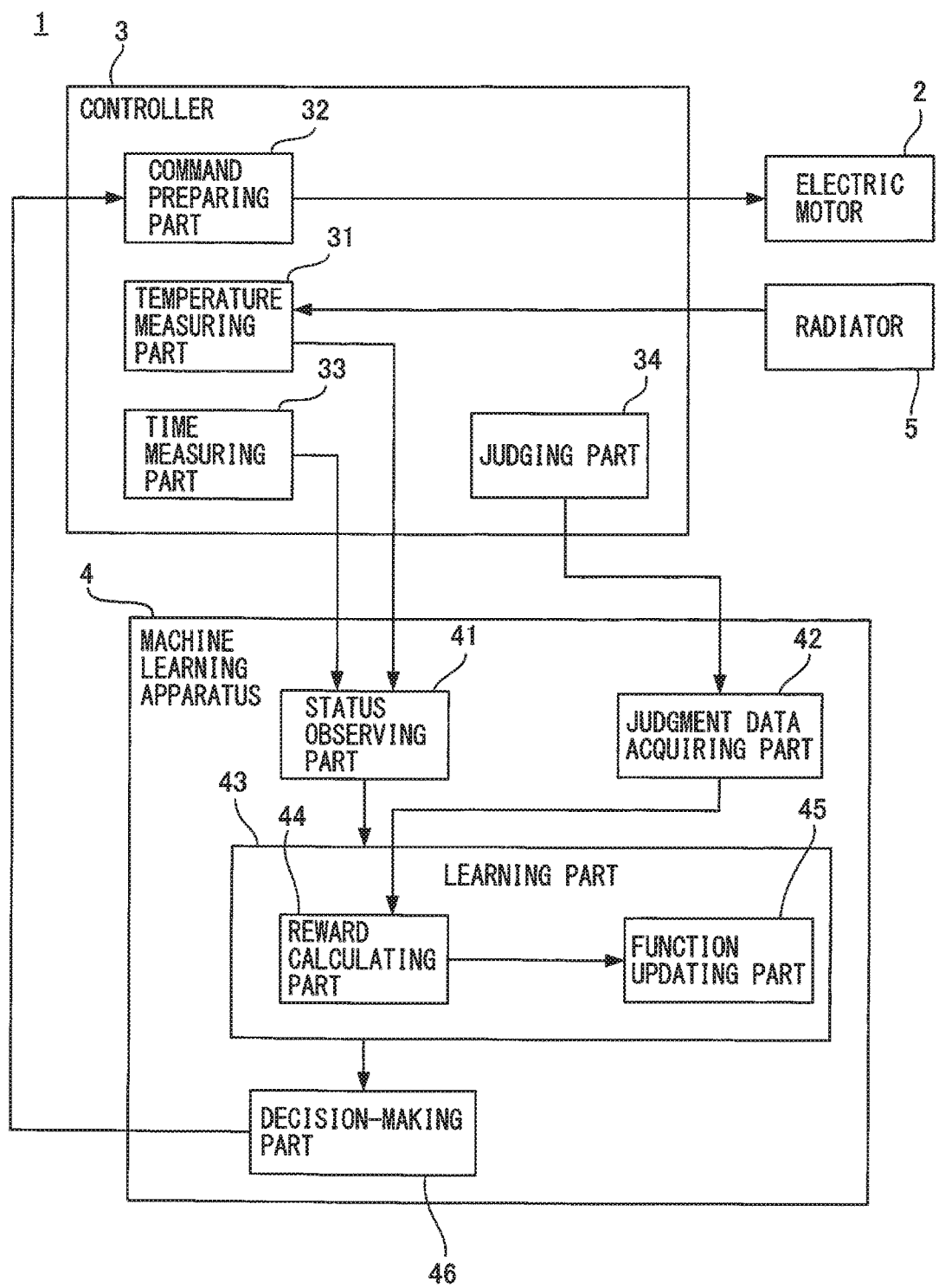
FIG. 1 is a block diagram of an electric motor apparatus according to one embodiment.

Below, embodiments of the present invention will be explained referring to the attached drawings. FIG. 1 is a block diagram of an electric motor apparatus 1 according to one embodiment. The electric motor apparatus 1 includes an electric motor 2, a controller 3 controlling the electric motor 2, a machine learning apparatus 4 learning an operating command to the electric motor 2, and a radiator 5.

The electric motor 2 is used for providing drive power to a shaft of a machine tool or an industrial robot. The electric motor 2 operates in accordance with an operating command prepared by the controller 3. An operating command includes a position command, speed command, and acceleration command. The machine learning apparatus 4 utilizes the technique of the later explained machine learning to learn an optimal acceleration command corresponding to the ambient temperature.

The controller 3 is a digital computer including a CPU, memory, and interface connected to each other by a bus. Alternatively, the controller 3 may be an amplifier supplying drive power to the electric motor 2 or may be a combination of a digital computer and amplifier. Below, an example where the controller 3 is a digital computer will be explained. The CPU performs processing required for realizing the various functions of the controller 3.

A memory includes a ROM, RAM, nonvolatile memory, etc. The ROM stores a system program controlling the overall operation of the controller 3. The RAM temporarily stores a detection signal from a detection device or detection circuit and processing results of the CPU etc. The nonvolatile memory stores an operating program for controlling the operation of the electric motor 2 and parameters etc.

The interface connects the controller 3 and external devices, for example, an input device and display device, etc. together and is used for sending and receiving signals and data between them.

The controller 3, as shown in FIG. 1, includes a temperature measuring part 31, command preparing part 32, time measuring part 33, and judging part 34.

The temperature measuring part 31 measures the ambient temperature of the electric motor apparatus 1. In one embodiment, the temperature measuring part 31 measures the temperature of the radiator 5 to thereby acquire the ambient temperature. The radiator 5 is used for dissipating the heat generated from a heat generating source of the electric motor apparatus 1. The radiator 5 is, for example, a heat sink configured so as to exchange heat with the outside air. The temperature changes in accordance with the ambient temperature of the electric motor apparatus 1. Therefore, by measuring the temperature of the radiator 5, it is possible to indirectly measure the ambient temperature.

In another embodiment, the temperature measuring part 31 can use a temperature sensor attached to the housing of the controller 3 to directly measure the ambient temperature. The "ambient temperature" measured by the temperature measuring part 31 in this Description means the temperature obtained by direct or indirect measurement of the outside air temperature. Alternatively, the "ambient temperature" may be found by calculation from a separate physical quantity in a correlative relationship with the ambient temperature. The ambient temperature measured by the temperature measuring part 31 is input to a status observing part 41 of the machine learning apparatus 4.

The command preparing part 32 generates an operating command for the electric motor 2 in accordance with an operating program and parameters stored in a nonvolatile memory. The controller 3 supplies electric power corresponding to the operating command to the electric motor 2.

The time measuring part 33 measures the cycle time of the electric motor 2 operating in accordance with an operating command output from the command preparing part 32. The cycle time may also be calculated for each block of the operating program. The cycle time measured by the time measuring part 33 is input to the status observing part 41 of the machine learning apparatus 4.

The judging part 34 judges if overheating is occurring at the electric motor apparatus 1 (below, sometimes called "overheating judgment"). The judging part 34 utilizes a detection circuit or detection device for detecting the temperature of a power element or other heat generating source used in an amplifier of the controller 3 to perform the overheating judgment. Alternatively, the judging part 34 may utilize a detecting means for detecting the temperature of any location at which an upper limit value of temperature is locally set to perform the overheating judgment. The result of the overheating judgment (below, sometimes referred to as the "judgment data") is input to the judgment data acquiring part 42 of the machine learning apparatus 4.

The machine learning apparatus 4, as shown in FIG. 1, includes a status observing part 41, judgment data acquiring part 42, learning part 43, and decision-making part 46.

The status observing part 41 observes the ambient temperature sent from the temperature measuring part 31 and the cycle time sent out from the time measuring part 33 as status variables. The status variables are input from the status observing part 41 to the learning part 43.

The judgment data acquiring part 42 acquires judgment data from the judging part 34 of the controller 3. The result of judgment is used for calculating a reward at the later explained reward calculating part 44.

The learning part 43 learns an operating command to the electric motor 2 in accordance with a training data set prepared based on the combination of the status variables sent from the status observing part 41 and judgment data sent from the judgment data acquiring part 42.

The decision-making part 46 uses the result of learning by the learning part 43 as the basis to determine an operating command to the electric motor 2 corresponding to the current status variables, in particular an acceleration command. The command preparing part 32 sends an acceleration command determined by the decision-making part 46 to the electric motor 2. Note that, the decision-making part 46 was explained as being included in the machine learning apparatus 4, but the decision-making part 46 may also be configured to be included in the controller 3. Further, the machine learning apparatus 4 may be configured included in the controller 3. The controller 3 may include a temperature measuring part 31, command preparing part 32, time measuring part 33, judging part 34, decision-making part 46, and machine learning apparatus 4 not containing the decision-making part 46.

The machine learning apparatus 4 may be a digital computer separate from the controller 3 or may be housed inside the controller 3. In the latter case, the machine learning apparatus 4 uses a CPU and memory of the controller 3 for machine learning.

In one embodiment, the machine learning apparatus 4 may be provided at a place separated from the electric motor 2 and controller 3. In that case, the machine learning apparatus 4 is connected through a network to the controller 3. Alternatively, the machine learning apparatus 4 may be present in a crowd server.

The machine learning apparatus 4 according to the present embodiment performs reinforcement learning in accordance with the known technique of Q-learning. The machine learning apparatus 4 learns the best action based on the action value function $Q(s,a)$ for finding the action value $Q$ (expected value) when selecting the action "a" (an operating command given to the electric motor 2) at the time of certain status variable "s" (current ambient temperature and current cycle time).

At the initial stage of learning, the action value Q allocated to a combination of a certain status variable "s" and action "a" is unknown. The machine learning apparatus 4 randomly selects and performs an action "a" for various status variables "s" and cumulatively adds a reward given as a result of the action "a" to thereby update the action value function Q(s,a). The general formula for updating the action value function Q(s,a) is expressed by formula 1.

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

Here, $s_t$ is a status variable at the time "t". $a_t$ is an action performed at the time "t". $s_{t+1}$ is a status variable at the time t+1, in other words, a status variable after change as a result of performing the action $a_t$. $r_{t+1}$ is a reward given corresponding to the environment changed as a result of the action $a_t$. The term "max" expresses the maximum value of the action value Q at the status variable $s_{t+1}$ (that is, the action value for the best action "a"). γ is a discount rate and is set so as to satisfy 0<γ≤1 (for example, γ=0.9 to 0.99). α is a learning coefficient and is set so as to satisfy 0<α≤1 (for example, α=0.05 to 0.2).

The updating formula represented by formula 1 makes action value Q larger if the action value of the best action "a" at the time t+1 is larger than the action value Q of the action "a" performed at the time "t", while makes the action value Q smaller in the opposite case. In other words, the action value function Q(s,a) is updated so as to make the action value Q of the action "a" at the time "t" approach the best action value at the time t+1. Due to this, the best action value in a certain environment is successively propagated to the action value at the previous environment.

If referring again to FIG. 1, the learning part 43 includes a reward calculating part 44 and a function updating part 45.

The reward calculating part 44 calculates the reward "r" based on the cycle time and judgment data of the electric motor 2. For example, if it is judged that overheating has not occurred and the cycle time is smaller than a predetermined threshold value, the reward "r" is increased (for example, reward of "1" is given). On the other hand, when it is judged that overheating is occurring or when the cycle time is the threshold value or more, the reward "r" is decreased (for example, reward of "−1" is given). Note that, a threshold value of a different magnitude may be used every predetermined time.

The function updating part 45 updates the function for determining an operating command to the electric motor 2 in accordance with the reward calculated by the reward calculating part 44. The function can be updated by for example updating the action value table according to the training data set. The action value table is a data set of any action and the value of that action linked together and stored in the form of a table.

Figure 2:
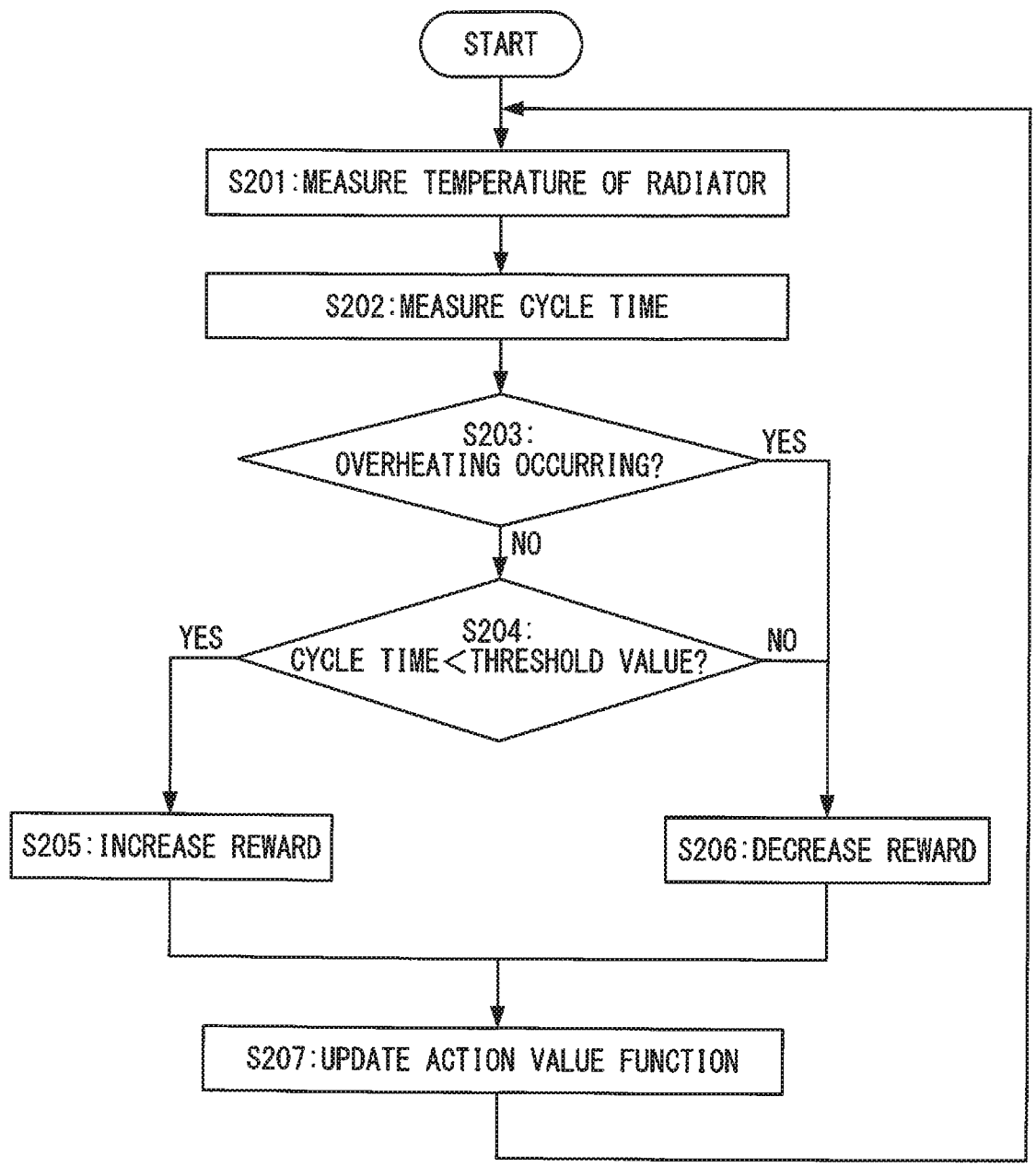
FIG. 2 is a flow chart showing a flow of a learning process in a machine learning apparatus.

Next, referring to the flow chart shown in FIG. 2, the reinforcement learning method for updating the action value Q(s,a) will be explained. At step S201, the temperature measuring part 31 measures the temperature of the radiator 5. At step S202, the time measuring part 33 measures the cycle time of the electric motor 2.

At step S203, at the electric motor apparatus 1, it is judged if overheating is occurring. The judgment at step S203 is performed in accordance with the judgment data output from the judging part 34. If the result of judgment of step S203 is negative, that is, if it is judged that overheating is not occurring, the routine proceeds to step S204.

At step S204, it is judged if the cycle time acquired at step S202 is smaller than a predetermined threshold value. If the result of judgment at step S204 is affirmative (if cycle time is smaller than threshold value), the routine proceeds to step S205. At step S205, the reward calculating part 44 increases the reward "r" so that the action value Q for the operating command given to the electric motor 2 is increased.

If the result of judgment at step S203 is affirmative or if the result of judgment at step S204 is negative, the routine proceeds to step S206. At step S206, the reward calculating part 44 decreases the reward "r" so that the action value Q for an operating command given to the electric motor 2 falls.

At step S207, based on the reward "r" calculated at step S205 or step S206, the function updating part 45 updates the action value function Q(a,s). After that, the routine again returns to step S201 where the processing of steps S201 to S207 is again performed for the newly selected operating command. The processing of steps S201 to S207 may be performed each time an operating command is changed or may be performed repeatedly at predetermined periods. At the initial stage of machine learning, the processing of steps S201 to S207 may be performed for a randomly prepared acceleration command.

Figure 3:
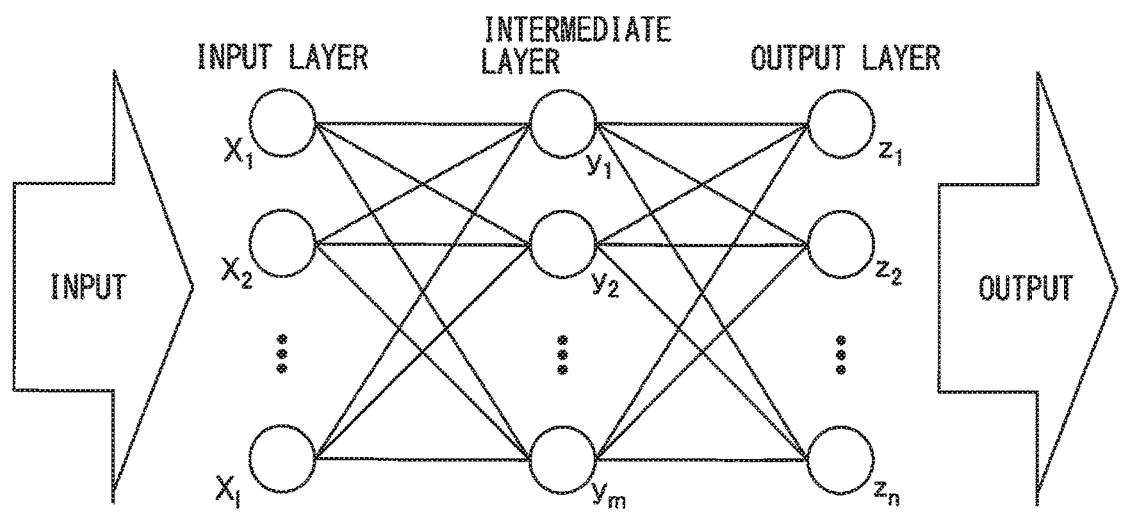
FIG. 3 is a view showing an example of the configuration of a neural network.

In another embodiment, the machine learning apparatus 4 may also perform machine learning in accordance with a neural network model. FIG. 3 shows an example of a neural network model. The neural network is comprised of an input layer including "1" number of neurons $x_1, x_2, x_3, \ldots, x_1$, an intermediate layer (hidden layer) including "m" number of neurons $y_1, y_2, y_3, \ldots, y_m$, and an output layer including "n" number of neurons $z_1, z_2, z_3, \ldots, z_n$. Note that, in FIG. 3, the intermediate layer is shown by just one layer, but two or more intermediate layers may also be provided.

The neural network learns the relationship between the ambient temperature of an electric motor apparatus 1, cycle time, and any occurrence of overheating. The neural network learns the relationship between the status variables and environmental changes based on a training data set prepared based on status variables and judgment data by so-called "supervised learning". According to the present embodiment, decision-making part 46 included in the electric motor controller 3 or the machine learning apparatus 4 is configured so that the output layer determines the optimum operating commands in response to status variables input to the input layer of the neural network.

Figure 4:
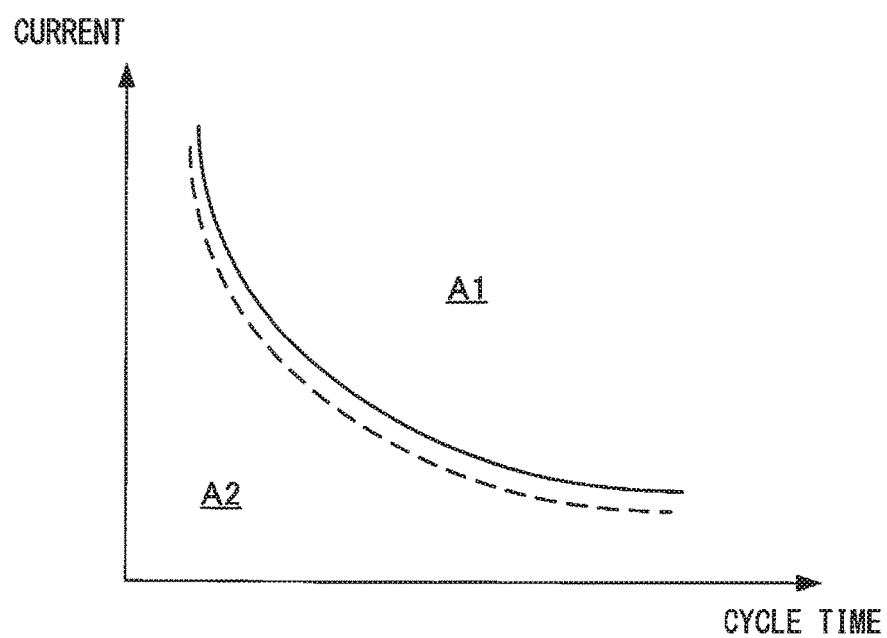
FIG. 4 is a view showing a relationship between current supplied to an electric motor and a cycle time.

According to the machine learning apparatus and machine learning method according to the above embodiment, it is possible to learn the optimum operating command for the ambient temperature of the electric motor apparatus 1. FIG. 4 is a view showing the relationship between the current supplied to the electric motor 2 and the cycle time. The solid line in the figure shows the case where overheating occurs at least at one location, while the broken line shows the case where an operating command found by using the above machine learning is given to the electric motor 2.

At the area A1 at the upper side from the solid line graph, overheating occurs, abnormal operation of the electric motor 2 is deemed to be occurring, and an emergency stop or alarm is initiated. The above-mentioned decision-making part 46 included in the electric motor controller 3 or the machine learning apparatus 4 decides on the operating command so that the operation is in the range of the area A2 below the solid line graph while approaching the boundary with the area A1. In other words, according to the present embodiment, the optimal operating command enabling the cycle time to be shortened as much as possible within a range where no overheating occurs is given to the electric motor 2.

As explained above, according to the present embodiment, utilizing the result of the machine learning, an operating command to the electric motor is automatically optimized, so it is no longer necessary to rely on the knowledge or experience of the operator. Furthermore, the optimal operating command for the ambient temperature is generated, so the operation of the electric motor can be optimized at all times. Further, the process of determining the optimal operating command is automated by machine learning, so there is no longer a need for trial and error and the load on the operator can be reduced.

In one embodiment, the learning part 43 may also be configured so as to learn an operating command in accordance with a training data set prepared for a plurality of electric motor apparatuses 1. The learning part 43 may acquire a training data set from a plurality of electric motor apparatuses 1 used on the same work floor or may utilize a training data set collected from electric motor apparatuses 1 operating independently on different work floors to learn malfunction conditions.

While an embodiment utilizing reinforcement learning and a neural network for machine learning was explained, another known method, for example, genetic programming, functional logic programming, support vector machine, etc., may also be used for machine learning.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

The machine learning apparatus and machine learning method according to the present invention learn an operating command to the electric motor in accordance with a training data set prepared based on the combination of the status variables and judgment data. The ambient temperature and cycle time of the electric motor apparatus and the occurrence of overheating are linked in learning an operating command, so the optimal operating command corresponding to the ambient temperature is learned.

The controller and electric motor apparatus according to the present invention make the electric motor operate in accordance with an operating command optimized in accordance with the ambient temperature, so the cycle time can be shortened without the occurrence of overheating.

What is claimed is:

1. A machine learning apparatus learning an operating command for an electric motor,
the machine learning apparatus comprising:
   a status observing part observing an ambient temperature of an electric motor apparatus that includes the electric motor and a controller controlling the electric motor, and a cycle time of the electric motor as status variables,
   a judgment data acquiring part acquiring judgment data judging if overheating has occurred in the electric motor apparatus, and
   a learning part learning an operating command to the electric motor in accordance with a training data set prepared based on a combination of the status variables and the judgment data.

2. The machine learning apparatus according to claim 1, wherein the learning part comprises:
   a reward calculating part calculating a reward based on the cycle time and the judgment data and
   a function updating part updating a function for determining the operating command based on the reward.

3. The machine learning apparatus according to claim 2, wherein the reward calculating part is configured to increase the reward when it is judged that overheating is not occurring in the electric motor apparatus and the cycle time is smaller than a predetermined threshold value and to decrease the reward when it is judged that overheating has occurred in the electric motor apparatus or the cycle time is the threshold value or more.

4. The machine learning apparatus according to claim 2, wherein the function updating part is configured to update an action value table in accordance with the reward.

5. The machine learning apparatus according to claim 1, wherein the learning part is configured to learn an operating command in accordance with a training data set prepared for a plurality of electric motor apparatuses.

6. A controller comprising:
   a machine learning apparatus according to claim 1,
   a temperature measuring part measuring the ambient temperature,
   a time measuring part measuring the cycle time, and
   a decision-making part determining the operating command corresponding to a current ambient temperature and current cycle time based on the result of learning by the learning part.

7. An electric motor apparatus comprising:
   a controller according to claim 6 and
   an electric motor controlled by the controller.

8. A machine learning method learning an operating command for an electric motor,
the machine learning method comprising:
   observing an ambient temperature of an electric motor apparatus that includes an electric motor and a controller controlling the electric motor and a cycle time of the electric motor as status variables,
   acquiring judgment data judging if overheating has occurred at the electric motor apparatus, and
   learning an operating command to the electric motor in accordance with a training data set prepared based on a combination of the status variables and the judgment data.

* * * * *